(No Model.)

J. DEMAREST.
HEATING APPARATUS.

No. 539,979. Patented May 28, 1895.

Witnesses.
Edward F. Allen
Thomas J. Drummond

Inventor:
John Demarest
by Crosby Gregory attys.

UNITED STATES PATENT OFFICE.

JOHN DEMAREST, OF MALDEN, MASSACHUSETTS.

HEATING APPARATUS.

SPECIFICATION forming part of Letters Patent No. 539,979, dated May 28, 1895.

Application filed October 31, 1894. Serial No. 527,508. (No model.)

*To all whom it may concern:*

Be it known that I, JOHN DEMAREST, of Malden, county of Middlesex, State of Massachusetts, have invented an Improvement in Heating Apparatus, of which the following description, in connection with the accompanying drawings, is a specification, like letters on the drawings representing like parts.

This invention relates to combination warm air and hot water or steam heating apparatus.

At the present time in putting in combination apparatus, particularly where hot water is used in connection with warm air, it is frequently found that the desired heating effect can be obtained from the hot water, but that the heating effect from the warm air is deficient, that is, the heating apparatus is unbalanced; and if the fire be forced sufficiently to give the requisite heating effect from the air, the boiler or water receiver within the heater is so heated that the water boils, or steam is generated and the water circulation stopped or seriously impaired. The only known remedy at the present time for the unbalanced combination heater, is taking down the heater and the substitution of a water boiler or receiver of smaller capacity relatively to the heater, or the addition of more radiators where not needed, in order that the fire may be forced sufficiently to provide warm air enough without generating steam, or otherwise impairing the circulation of the water by excessive heat. I have, accordingly, studied to devise means by which an unbalanced heater may be balanced after it is set up, and without taking it to pieces or supplying additional radiators. My efforts have resulted in the invention forming the subject of this application, and which consists in providing the water-receiver,—whether in the form of a boiler or one or more water backs or tables,—with preferably a plurality of removable shields by which the heat imparted to the water in the receiver may be regulated after the heater has been set up and tested.

In the preferred embodiment of my invention, the water receiver is in the form of a hollow cone arranged within the heating chamber immediately above the fire, and upon the interior of the conical receiver I arrange one or more, preferably ring-like, shields of suitable material,—it may be of fire brick,— which shield the inner wall of the receiver from the direct action of the products of combustion ascending from the fire below. These shields may, one or all, be removed as may be found necessary, to give to the water receiver the desired capacity for supplying hot water.

Figure 1:
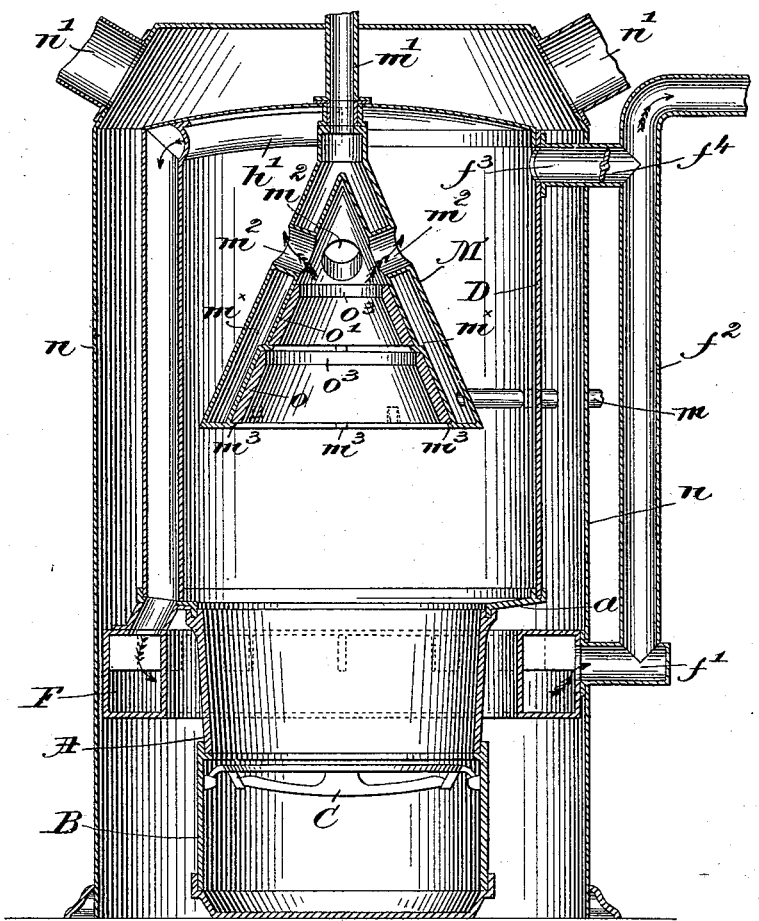
Figure 2:
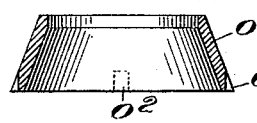

In the drawings, Figure 1, in vertical section, represents one embodiment of my invention; Fig. 2, a sectional detail showing the type of shield employed in Fig. 1, and Figs. 3 and 4 views illustrating modifications of my invention.

Referring to the drawings Fig. 1, A, represents a fire-pot of suitable or usual construction, shown as mounted upon an ash-receptacle or pit B, provided with a suitable grate C; D representing the dome or heating chamber resting on a flaring ring $a$ sustained upon the top of the fire-pot.

The products of combustion escape from the dome D through a downwardly extended conduit $h'$ leading from the top center of the dome down within and next the side of the same to and entering the radiator F encircling the fire-pot, and having its outlet at $f'$, into the bottom of the smoke pipe $f^2$, which latter, near its upper end is also connected with the heating chamber by a direct connection $f^3$ controlled by a damper $f^4$, all substantially as shown in my application, Serial No. 517,635.

Within the heating chamber or dome D, I have arranged a hollow conical water-receiver or boiler M, the return water pipe constituting the inlet for the water-receiver entering at $m$, and the outlet being at $m'$ through the crown of the dome. An outer casing $n$ encircles the dome, and is provided with usual warm air exit pipes $n'$.

The water-receiver M, as herein shown, is provided with a series of perforations $m^2$, through which the products of combustion rising within the said receiver, may escape into the dome.

In accordance with my invention, I provide the receiver M with one or more shields $o, o'$, the same being herein represented as rings of fire-brick or other suitable heat-resisting material, shown as notched at $o^2$, see Fig. 2, to enable them to be inserted past the holding lugs $m^3$ on the interior surface of the receiver, the said rings being partially rotated above the said lugs to carry their notches $o^2$ out of register therewith, whereby the said lugs serve as supports to hold the said rings in position.

The water space within the heater is widened above the successive rings, as shown at $m^x$ which, in connection with the beveled upper edges $o^3$ of the rings enable the latter to be inserted and withdrawn independently.

In combination heaters, little difficulty is experienced in obtaining hot water or steam enough, but great difficulty is encountered in obtaining the requisite quantity of warm air, and as the quantity of warm air given off from a heater is very uncertain, varying under different conditions of atmosphere, wind, &c., it is frequently the case that a heater which is balanced under certain normal conditions, will, when placed in operation be found to be deficient in warm air, yet have a surplus of hot water.

As previously stated, it is impossible to force the fire to the utmost capacity of the heater in order to provide warm air enough, for under such conditions the water-receiver would be unduly heated and the circulation be impaired by the generation of steam or the boiling of the water. In this my present invention, however, the heater is set up with the shields $o$, $o'$, in position to prevent excessive heating of the water-receiver, and is run under a forced fire for a considerable period of time, and the warm air given off noted, and the heater rated thereby. By rating the heater in this manner it is impossible to afterward maintain a fire sufficiently hot to boil the water or generate steam in the water-receiver when the shields are left in position. If now the heater is placed in position in a dwelling with the shields still in position, and after operation for a short time, the heater is found deficient in warm air given off with a normal or ordinary fire, it will be possible to obtain the requisite amount of warm air by forcing the fire without danger of boiling the water, because the heater was previously tested with a forced fire with the shields in position. If the heater is found to give sufficient warm air with a normal or moderate fire, as it should be, inasmuch as heaters are always supposed to be rated for a capacity beyond that to which they are usually expected to be forced, but that the hot water supply is deficient, one or all of the shields may be removed, as is necessary, to expose additional heating surface to the receiver to increase the supply of water, without lessening to any material extent the supply of warm air. It will thus be seen that my improved heater may be regulated or balanced after it has been placed in position, without requiring it to be taken down or apart, or additional hot water radiating surfaces provided.

My invention is not limited to its use in connection with any particular type of heater, the heater herein shown being selected simply for the purpose of illustration; and my invention is applicable to other forms of water-receivers than that shown in Fig. 1. For instance, Fig. 3, is a perspective view looking at the under side of a water table, of which a series are frequently employed within a heating chamber to provide the warm water desired.

Figure 3:
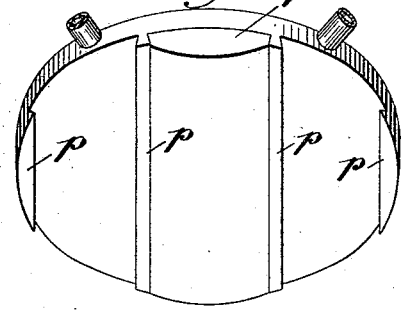

In the construction Fig. 3, I have provided a plurality of cross dovetail lips or projections $p$, $p$, between which may be inserted slabs $p'$ of fire brick or other suitable heat-resisting material which may be inserted and withdrawn at will for the purpose of regulating the heating surface exposed to the action of the products of combustion and the quantity of hot water or steam produced.

Figure 4:
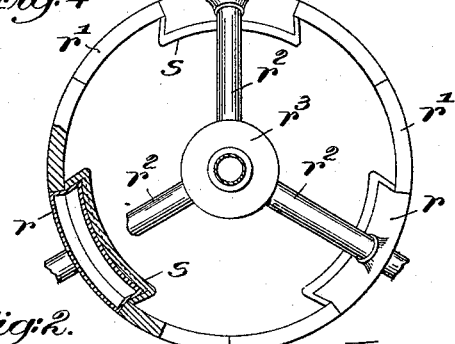

Fig. 4 is a view looking down upon the top of the fire pot in which a plurality of water-backs $r$, $r$, are arranged between the lining sections $r'$ of the fire-pot, the said water backs being connected by the short pipes $r^2$ with a common head $r^3$ from which the water exit leads.

In the construction Fig. 4, I may provide shields $s$, $s$, adapted to embrace the projecting water backs, and shield the latter from the direct action of the products of combustion within the fire pot, one or all of these shields being removed or reduced in size, as necessary, to obtain the proper amount of exposed heating surface for the said water-backs $r$.

These different constructions show the adaptability of my invention for heaters of various constructions.

Having described my invention, and without limiting myself as to details, what I claim, and desire to secure by Letters Patent, is—

1. A combination heater containing a heating chamber, a water-receiver, and one or more removable shields for and to regulate the quantity of heat supplied to the said water-receiver, substantially as described.

2. A combination heater containing a heating chamber, a conical water-receiver within the same, and one or more removable shields for and to regulate the quantity of heat supplied to the said receiver, substantially as described.

3. A combination heater containing a heating chamber, a conical water-receiver within the said chamber, and one or more ring-like shields $o$ provided with notches $o^2$, and lugs on the receiver to retain the said rings in position shielding a part of the surface of the said receiver, substantially as and for the purposes specified.

In testimony whereof I have signed my name to this specification in the presence of two subscribing witnesses.

JOHN DEMAREST.

Witnesses:
FREDERICK L. EMERY,
AUGUSTA E. DEAN.